United States Patent
Hsu et al.

(10) Patent No.: US 8,259,818 B2
(45) Date of Patent: Sep. 4, 2012

(54) DEBLOCKING APPARATUS AND ASSOCIATED METHOD

(75) Inventors: Han-Jen Hsu, Hsinchu Hsien (TW); Wei-Kuo Lee, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 352 days.

(21) Appl. No.: 12/603,226

(22) Filed: Oct. 21, 2009

(65) Prior Publication Data

US 2011/0013704 A1   Jan. 20, 2011

(30) Foreign Application Priority Data

Jul. 20, 2009   (TW) ................................ 98124450 A

(51) Int. Cl.
*H04N 7/12* (2006.01)
*H04N 11/02* (2006.01)
*H04N 11/04* (2006.01)

(52) U.S. Cl. ............................. 375/240.29; 375/240.26

(58) Field of Classification Search .................. None
See application file for complete search history.

(56) References Cited

U.S. PATENT DOCUMENTS

| | | | |
|---|---|---|---|
| 2004/0101059 A1* | 5/2004 | Joch et al. | 375/240.29 |
| 2005/0265623 A1* | 12/2005 | Estevez et al. | 382/268 |
| 2006/0171458 A1* | 8/2006 | Feng et al. | 375/240.03 |
| 2008/0117981 A1* | 5/2008 | Lee et al. | 375/240.24 |
| 2008/0240604 A1* | 10/2008 | Subedar et al. | 382/268 |
| 2008/0253454 A1* | 10/2008 | Imamura et al. | 375/240.13 |

FOREIGN PATENT DOCUMENTS

CN   1398115 A   2/2003

* cited by examiner

*Primary Examiner* — Joseph Ustaris
*Assistant Examiner* — Kevin McInnish
(74) *Attorney, Agent, or Firm* — WPAT, PC; Justin King

(57) ABSTRACT

A deblocking apparatus is provided. The deblocking apparatus includes a filter, a blocking detection module and a blending unit. The filter receives a target pixel of a pixel matrix to generate a filtered target pixel. The blocking detection module generates a deblocking intensity factor according to the pixel matrix. The blending unit receives the target pixel and the filtered target pixel, and dynamically blends the target pixel and the filtered target pixel to output an output pixel according to the deblocking intensity factor.

18 Claims, 7 Drawing Sheets

DEBLOCKING APPARATUS AND ASSOCIATED METHOD

CROSS REFERENCE TO RELATED PATENT APPLICATION

This patent application is based on Taiwan, R.O.C. patent application No. 98124450 filed on Jul. 20, 2009.

FIELD OF THE INVENTION

The present invention relates to image processing, and more particularly to a deblocking apparatus and method.

BACKGROUND OF THE INVENTION

In the digital video signal processing, generally a digital video signal is encoded and compressed for the high-speed transmission in a bandwidth-limited channel. For example, Moving Picture Experts Group (MPEG) is a block-based video compression format.

After being encoded and compressed, the video signal is transmitted through a transmission channel to a decoder, which then decodes and decompresses the video signal. However, an annoying block artifact occurs after the decoder reconstructs the video signal such that one can observe obvious block boundaries since the source video signal is encoded on a block-by-block basis.

FIG. 1 is a block diagram of a conventional deblocking apparatus. In a conventional apparatus, a low-pass filter 11 is used to process an input video signal received by a display apparatus to output a filtered video signal. However, an improper process may result in a blurred image and many image details may be lost. Moreover, a conventional technique needs to know a blocking boundary in advance in order to deblock correctly. However, it is difficult to meet such requirement under certain situations at a receiving end, e.g., at an analog television (ATV).

Therefore, it is desirable to provide a deblocking apparatus and an associated method for deblocking effectively without knowing the blocking boundary in advance.

SUMMARY OF THE INVENTION

It is one of the objectives of the present invention to provide a deblocking apparatus and method for deblocking an input video signal, generally a pixel matrix, without knowing a blocking boundary in advance.

Hence, the invention provides a deblocking apparatus. The deblocking apparatus comprises a filter for receiving a target pixel of the pixel matrix to generate a filtered target pixel; a blocking detection module for generating a deblocking intensity factor according to the pixel matrix; and a blending unit for receiving the target pixel and the filtered target pixel, and for dynamically blending the target pixel and the filtered target pixel according to the deblocking intensity factor to generate an output pixel. Preferably, the blocking detection module comprises an infinite impulse response (IIR) filter for calculating an average over a period to adjust the deblocking intensity factor, wherein the pixel matrix comes from an input video signal, and the period corresponds to a compression type of the input video signal.

A deblocking method is further provided. The deblocking method comprises receiving the pixel matrix; generating a deblocking intensity factor of a target pixel corresponding to the pixel matrix according to the pixel matrix; and dynamically generating an output pixel by processing the target pixel according to the deblocking intensity factor. Preferably, the step of generating the deblocking intensity factor is generating the deblocking intensity factor according to an image coarseness corresponding to the target pixel and a slope difference corresponding to a neighboring pixel of the target pixel

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
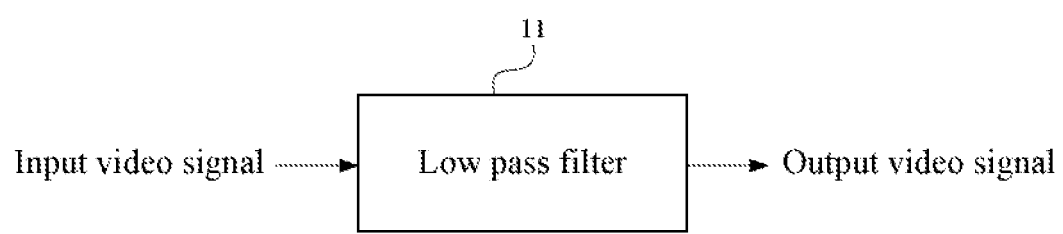
FIG. 1 is a block diagram of a conventional deblocking apparatus.
Figure 2:
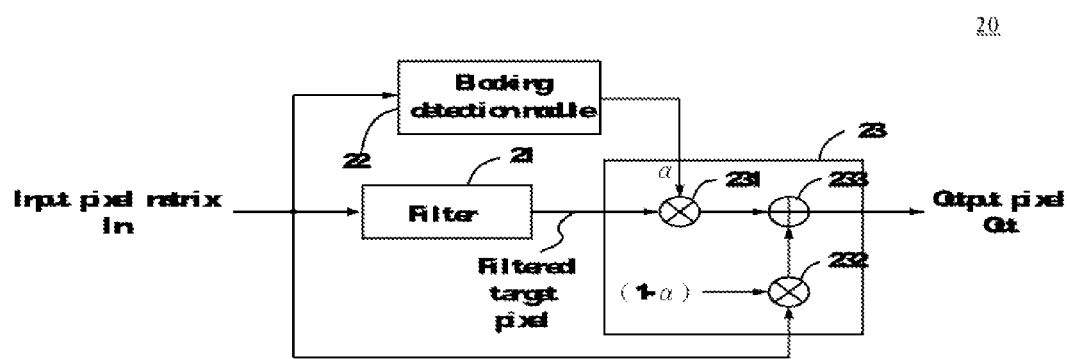
FIG. 2 is a circuit block diagram of a deblocking apparatus according to one embodiment of the present invention.

FIG. 2 is a circuit block diagram of a deblocking apparatus according to one embodiment of the present invention. The deblocking apparatus 20 comprises a filter 21, a blocking detection module 22 and a blending unit 23. The deblocking apparatus 20 receives an M×N pixel matrix In and outputs a deblocking pixel Out by deblocking a target pixel in the pixel matrix In. Each pixel has a pixel value $P(i,j)$, where $i=1$ to M, and $j=1$ to N. Each pixel value represents R, G or B value in the R-G-B color space, where each of the R, G and B values is an integer, e.g., between 0 and 255. Alternatively, a pixel value $P(i,j)$ represents Y, U and V value of a pixel in the Y-U-V color space, or a pixel value $P(i,j)$ represents Y, Cb and Cr value of a pixel in the Y-Cb-Cr color space. Those skilled in the art shall conceive transformation among different color spaces, and herein no further details are given.

The target pixel is outputted to be a filtered target pixel through the filter 21. The block detection module 22 also receives the target pixel, and generates a deblocking intensity factor α according to the target pixel. The blending unit 23 dynamically blends the target pixel and the filtered target pixel to output another pixel Out according to the deblocking intensity factor α.

The deblocking apparatus 20 detects the severity of the blocking artifact through the deblocking detection module 22. For example, the deblocking intensity factor α becomes larger as the blocking artifact gets more severe. That is, the output pixel is more likely to accept the filtered target pixel but not the original input target pixel. Conversely, the deblocking intensity factor α becomes smaller as the blocking artifact gets milder. That is, the output pixel is more likely to accept the original input target pixel but not the filtered target pixel. Preferably, the deblocking intensity factor α is between 0 and 1. Hence, with the deblocking intensity factor α generated by the blocking detection module 22, the deblocking apparatus 20 need not know the blocking encoder information in advance, such as a blocking encoding type or a quantization step, to improve the video quality effectively.

The filter 21 shown in FIG. 2, for example, can be realized by a first order low-pass filter perpendicular to a blocking boundary. For example, at a vertical blocking boundary, a horizontal low-pass filter is used, and at a horizontal blocking boundary, a vertical low-pass filter is used.

Figure 3:
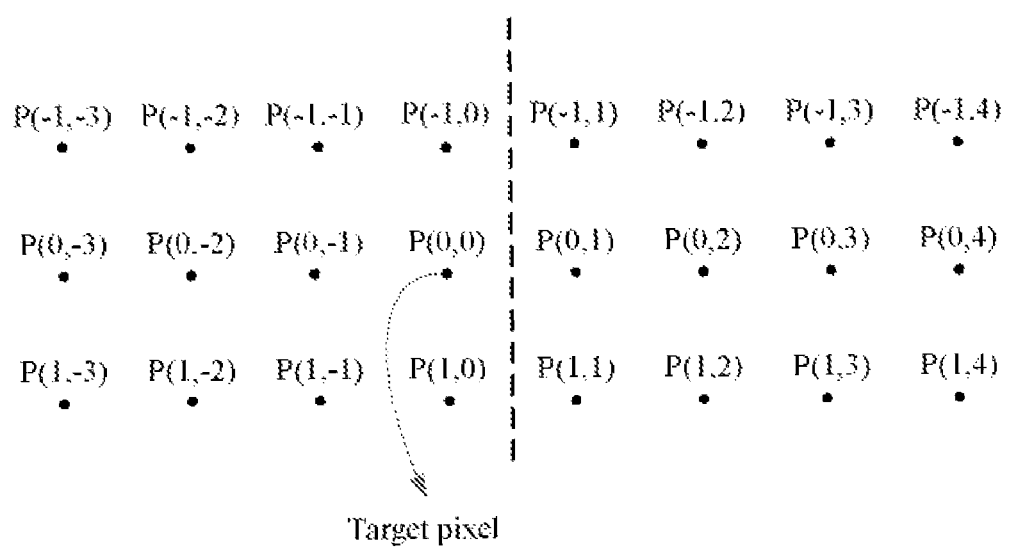
FIG. 3 is a pixel matrix diagram according to one embodiment of the present invention.

FIG. 3 is a pixel matrix diagram according to one embodiment of the present invention. P(y,x) represents a pixel in the pixel matrix. In this embodiment, P(0,0) represents the target pixel. M(y,x) represents a slope difference of a neighboring pixel for calculating the deblocking intensity factor α. In a detailed region, the deblocking intensity factor α is adjusted to a smaller value to reduce an impact on the target pixel from the low-pass filter. However, in a region seriously suffering the blocking artifact, the deblocking intensity factor α is adjusted to a larger value to enhance the deblocking effect on the target pixel by the filter. Also referring to FIG. 2, the deblocking apparatus 20 detects a blocking artifact location to determine the deblocking intensity factor α and deblocks the video image. The slope difference of the neighboring pixel M(y,x) is illustrated as follows:

$$M(y,x)=|(P(y,x+1)P(y,x))-[(P(y,x+2)-P(y,x+1))/2+(P(y,x)-P(y,x-1))/2]|$$

Taking FIG. 3 for example, M(y,0) can be represented as follows:

$$M(0,0)=(P(0,1)-P(0,0))-[(P(0,2)-P(0,1))/2+(P(0,0)-P(0,-1))/2]$$

$$M(-1,0)=(P(-1,1)-P(-1,0))-[(P(-1,2)-P(-1,1))/2+(P(-1,0)-P(-1,-1))/2]$$

$$M(1,0)=(P(1,1)-P(1,0))-[(P(1,2)-P(1,1))/2+(P(1,0)-P(1,-1))/2]$$

$$M(y,0)=|M(-1,0)|+|M(0,0)|+|M(1,0)|$$

Then, M(y,−2) can be represented as follows:

$$M(0,-2)=(P(0,-1)-P(0,-2))-[(P(0,0)-P(0,-1))/2+(P(0,-2)-P(0,-3))/2]$$

$$M(-1,-2)=(P(-1,-1)-P(-1,-2))-[(P(-1,0)-P(-1,-1))/2+(P(-1,-2)-P(-1,-3))/2]$$

$$M(1,-2)=(P(1,-1)-P(1,-2))-[(P(1,0)-P(1,-1))/2+(P(1,-2)-P(1,-3))/2]$$

$$M(y,-2)=|M(-1,-2)|+|M(0,-2)|+|M(1,-2)|$$

Finally, M(y,2) can be represented as the following:

$$M(0,2)=(P(0,3)-P(0,2))-[(P(0,4)-P(0,3))/2+(P(0,2)-P(0,1))/2]$$

$$M(-1,2)=(P(-1,3)-P(-1,2))-[(P(-1,4)-P(-1,3))/2+(P(-1,2)-P(-1,1))/2]$$

$$M(1,2)=(P(1,3)-P(1,2))-[(P(1,4)-P(1,3))/2+(P(1,2)-P(1,1))/2]$$

$$M(y,2)=|M(-1,2)|+|M(0,2)|+|M(1,2)|$$

In this embodiment, according to image coarseness, the deblocking intensity factor α is adjusted for adapting to the images with various coarseness values. For example, the coarseness of the flowing water is simple, with the difference between the pixel and the neighboring pixel being small, and so blocking artifact is processed immediately if present. On the contrary, the coarseness of the grass is complicated, with the difference between the pixel and the neighboring pixel being greater, such that image details may be blurred if blocking artifact is over-processed. Preferably, blocking artifact is considered present only when the slope difference gets greater. Therefore, the deblocking intensity factor α is adjusted according to different coarseness values of various images. For example, the coarseness Coar can be represented as follows:

$$Coar=|P(-1,0)-P(-1,-1)|+|P(-1,2)-P(-1,1)|+|P(0,0)-P(0,-1)|+|P(0,2)-P(0,1)|+|P(1,0)-P(1,-1)|+|P(1,2)-P(1,1)|$$

In this embodiment, according to the coarseness, M(y,−2) and M(y,2), one can look up a lookup table (LUT) to calculate the deblocking intensity factor α. The lookup table can be generated by the functional relation. For example, it can be generated by a one dimensional counter table, such as LUT (x)=−mx+a, where a and m are positive constants, and LUT (x), from the lookup table, represents a value corresponding to x. Therefore, in this embodiment, the deblocking intensity factor α of the target pixel P(0,0) can be processed pixel by pixel to dynamically generate the deblocking intensity factor α. Since each position of each pixel has its own deblocking intensity factor α, the deblocking intensity factor α of the target pixel P(0,0) can be represented by a function α(x) for the pixel x. The target pixel P(0,0) is located at y=0 and x=0. The deblocking intensity factor α of the target pixel P(0,0), α(0), can be represented as follows:

$$\alpha(0)=M(y,0)*LUT(\max(M(y,-2),M(y,2)))*LUT(Coar) \quad (1)$$

Figure 4:
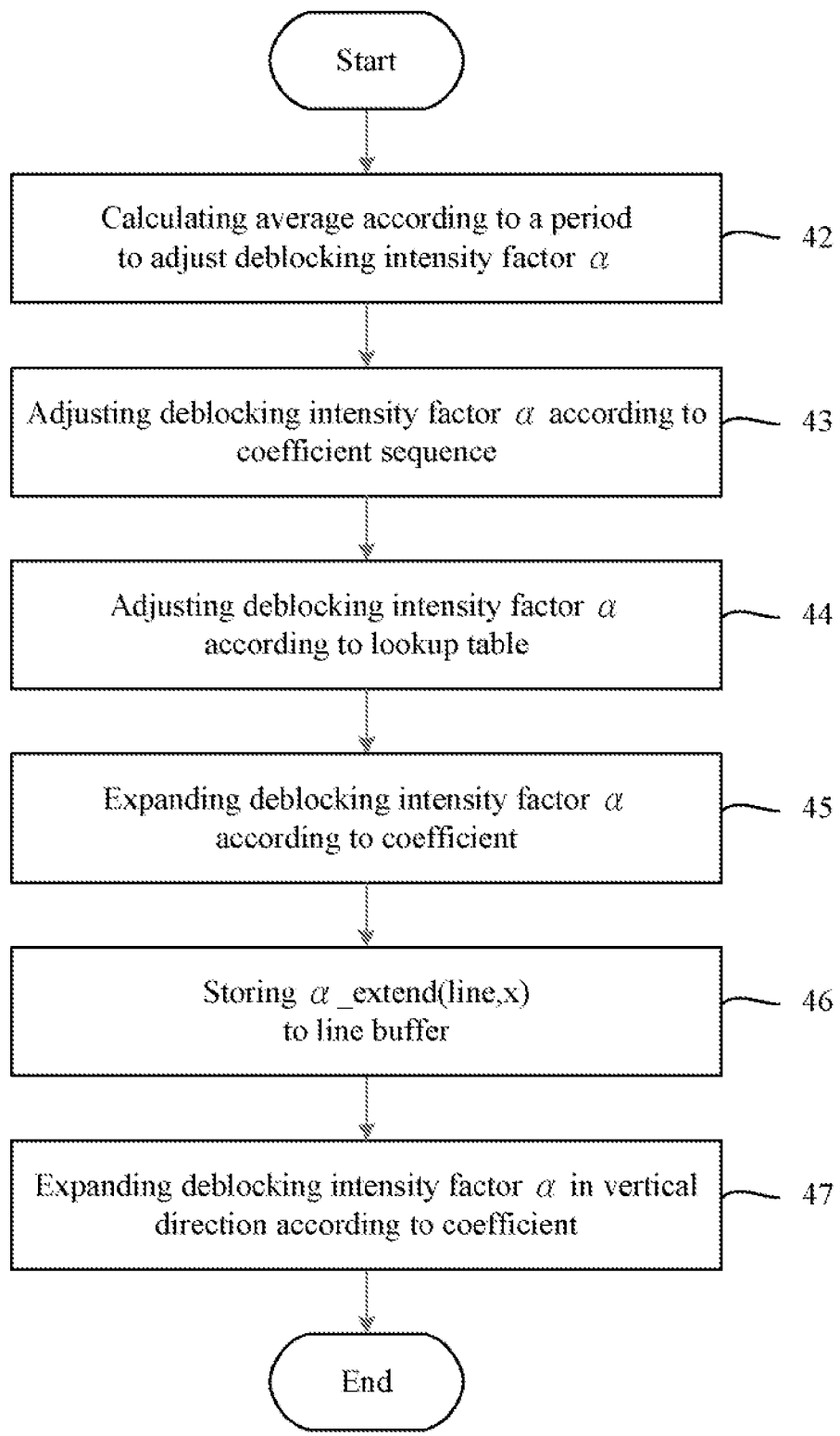
FIG. 4 is a flowchart of adjusting the deblocking intensity factor according to one embodiment of the present invention.

FIG. 4 is a flowchart of adjusting the deblocking intensity factor α according to one embodiment of the present invention. Equation (1) illustrates a method for dynamically generating the deblocking intensity factor α. Those skilled in the art can make proper modifications using the deblocking intensity factor α, for example, as Steps 42 to 47 shown in FIG. 4.

As the Step 42 shown in FIG. 4, to calculate the deblocking intensity factor α, a periodic compression characteristic of the MPEG signal is utilized to infer that a blocking artifact location appears repeatedly. In order to provide tolerance of the blocking artifact location, the tolerance range, bounded by an upper limit and a lower limit of a period, is adopted for adjusting the deblocking intensity factor α in Equation (1). For example, in the ATV, the typical range of the blocking size for the periodic blocking compression signal is 7 to 9. In this embodiment, the lower limit is 7, and the upper limit is 9. That is, it is determined whether the blocking artifact appears periodically from 7 to 9 pixel positions ahead of the target pixel P(0,0). With this typical period, an average is calculated, and the deblocking intensity factor α can be further adjusted to be α_IIR. This period can be user-defined, or one can calculate and gather statistics from all periodic peak values of the image, and the period can be acquired from the periodic peak value locations. For example, the pixel matrix In shown in FIG. 2 comes from an input video signal, and the period corresponds to a compression type of the input video signal. However, a large amount of memory and operations are needed to calculate and gather statistics. It is to be noted that the period can be a user-defined value, of which the tolerable range is not limit to 7 to 9, and this embodiment can be realized by using only a small amount of memory and operations. For example, an infinite impulse response (IIR) filter is used to calculate the average α_IIR, which can be represented as follows:

$$\alpha 1=\max(\alpha(x-\text{lower limit}),\alpha(x-\text{lower limit}+1),\ldots,\alpha(x-\text{upper limit}-1),\alpha(x-\text{upper limit}))$$

α_IIR(x)=β*α1+(1−β)*α(x), where β is a weighted average between 0 and 1. For example, β is usually greater than 0.5 to prevent a suddenly increased or a suddenly reduced α1 from excessively affecting α_IIR. The blocking size of the MPEG is 8. However, when applying to the other encoding types, one can properly adjust the period as one sees appropriate. For example, the video coding blocking size of H.264 is variable from 4 to 16, and then one can set the period as the smallest blocking size, i.e., 4, so that this method still applicable for detecting the periodic peak value.

Moreover, in order to strengthen the deblocking intensity factor α as well as to enhance the ability of distinguishing the blocking artifact and reduce the impact on the video for misjudging the blocking artifact, for example, as Step 43, the central deblocking intensity factor α is enlarged, and the neighboring deblocking intensity factor α is reduced. According to a coefficient sequence, such as [−1 0 2 0 −1], [−1 −1 4 −1 −1], [−2 −2 4 −2 −2], [−1 0 4 0 −1] or [−1 0 0 2 0 0 −1], by using a finite impulse response (FIR) filter, another enhanced deblocking intensity factor α_FIR is outputted as follows:

$$\alpha\_FIR(x)=[-2*\alpha\_IIR(x-2)+0*\alpha\_IIR(x-1)+4*\alpha\_IIR(x)+0*\alpha\_IIR(x+1)+(-2)*\alpha\_IIR(x+2)]/2$$

In the above equation, one selects the target pixel along with the two left and two right neighboring pixels, i.e., a total of five pixels, as the adjustment reference. Alternatively, one can choose the target pixel along with the three left and three right neighboring pixels, i.e., a total of seven pixels for the adjustment reference, shown as follows:

$$\alpha\_FIR(x)=[-2*\alpha\_IIR(x-3)+0*\alpha\_IIR(x-2)+0*\alpha\_IIR(x-1)+4*\alpha\_IIR(x)+0*\alpha\_IIR(x+1)+0*\alpha\_IIR(x+2)+(-2)*\alpha\_IIR(x+3)]$$

For restraining sudden blocking artifact in a smooth region, an additional blocking restraining module is applied for adjusting the deblocking intensity factor α to α_adjust. As Step 44, with a summation on the previously calculated deblocking intensity factors α of the neighbors of the target pixel, one can look up a lookup table to obtain an error adjustment value for adjusting the deblocking intensity factor α of the target pixel. The lookup table is similar to the previously mentioned functional relation. α_adjust(x) can be represented as follows:

$$\alpha\_adjust(x) = \alpha\_FIR(x) - LUT\left(\sum_{i=1}^{N} \alpha\_FIR(x-i)\right)$$

Furthermore, after calculating the deblocking intensity factor, one can expand the deblocking intensity factor to a neighboring pixel according to a coefficient. For example, as Step 45, one can reproduce the deblocking intensity factor α of the target pixel as the deblocking intensity factor α of a vertical neighboring pixel or a horizontal neighboring pixel of the target pixel. In this embodiment, after calculating the deblocking intensity factor α of the target pixel P(0,0), preferably, one can reproduce the deblocking intensity factor α of the target pixel P(0,0) to apply the reproduced deblocking intensity factor α to a neighboring pixel P(0,1), as shown below:

$$\alpha\_extend(x)=max(\alpha\_adjust(x-2),\alpha\_adjust(x-1),\alpha\_adjust(x),\alpha\_adjust(x+1),\alpha\_adjust(x+2))$$

The above embodiment mainly discloses calculation of the vertical line relative to the horizontal direction, and the similar method can also be applied to calculation of the horizontal line relative to the vertical direction. Further, since the location of the blocking artifact is fixed, the target pixel and the neighboring pixels corresponding to the target pixel should have the similar deblocking intensity factor α. For the continuity of the image after deblocking, as Steps 46 and 47, one can store the previously calculated deblocking intensity factor of the vertical neighbors of the target pixel in a line buffer to provide a reference to the target pixel. Preferably, one can blend the deblocking intensity factors α of the target pixel and the neighboring pixels according to a weighted average γ, as shown below:

$$\alpha(line,x)=\gamma*\alpha\_extend(line-1,x)+(1-\gamma)*\alpha\_extend(line,x)$$

γ is a positive number between 0 and 1 for adjusting a degree of impact that the deblocking intensity factor α of the vertical neighboring pixels has on the target pixel. For example, as γ gets larger, the impact that the deblocking intensity factor α of the vertical neighboring pixel of the target pixel imposes on the deblocking intensity factor α of the target pixel also becomes greater. On the contrary, as γ gets smaller, the impact that the deblocking intensity factor α of the vertical neighboring pixel of the target pixel imposes on the deblocking intensity factor α of the target pixel also becomes less. For example, if the hardware design requires that the data of a neighboring scan line be referred, then one only needs to add the line buffer with the length of one scan line. For example, if this embodiment is applied to the high-definition (HD) display mode under the resolution of 1920× 1080, one can add 1920 line buffers each with the length of one scan line to improve the continuity for the deblocking intensity factor α of the vertical direction.

Figure 5A:
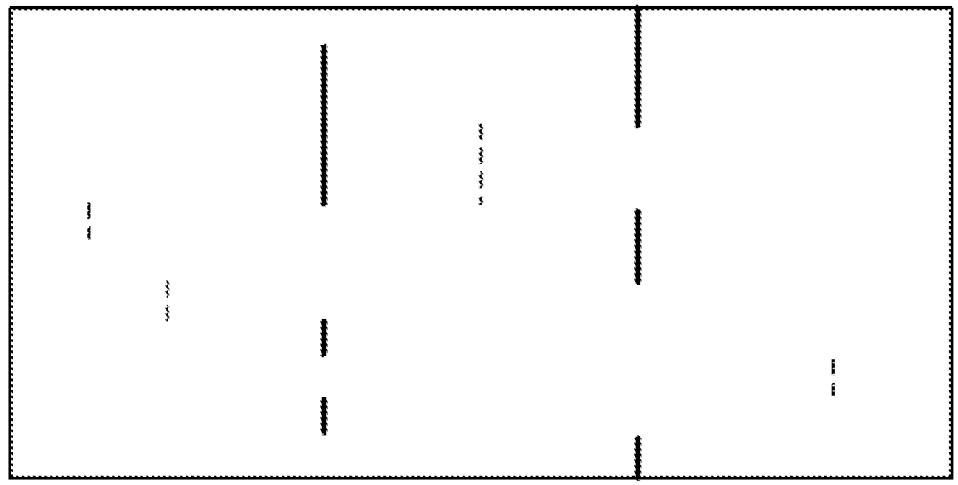
FIGS. 5A and 5B are schematic diagrams of detecting the blocking artifact location of an image according to one embodiment of the present invention.
Figure 5B:
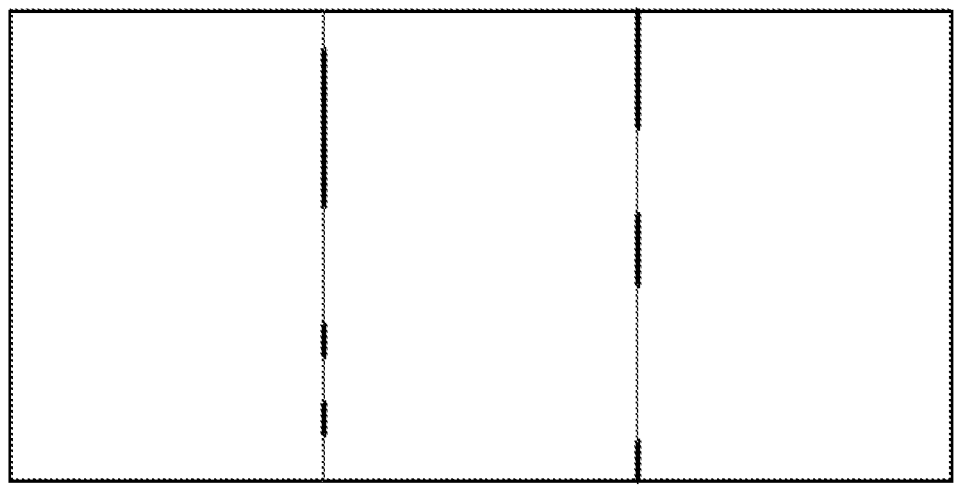

FIGS. 5A and 5B are schematic diagrams of detecting the blocking artifact location of an image according to one embodiment of the present invention. For example, the deblocking intensity factor α can be obtained by Equation (1), such as the blocking artifact as shown in FIG. 5A. Bold lines indicate the real blocking boundaries; thin dotted lines indicate the misjudged blocking artifact, which may undesirably affect the detailed region of the image if not removed. Hence, by adjusting the deblocking intensity factor α, such as adjusting to α_IIR, α_FIR, α_adjust, α_extend or α(line,x), the deblocking intensity factor α of the pixels at the bold lines shown in FIG. 5A is enlarged, and the deblocking intensity factor α of the pixels at the thin dotted lines shown in FIG. 5A is decreased. As shown in FIG. 5B, the deblocking effect of the thin lines is enhanced, and the misjudged blocking artifact of the thin dotted lines shown in FIG. 5A is removed.

Figure 6:
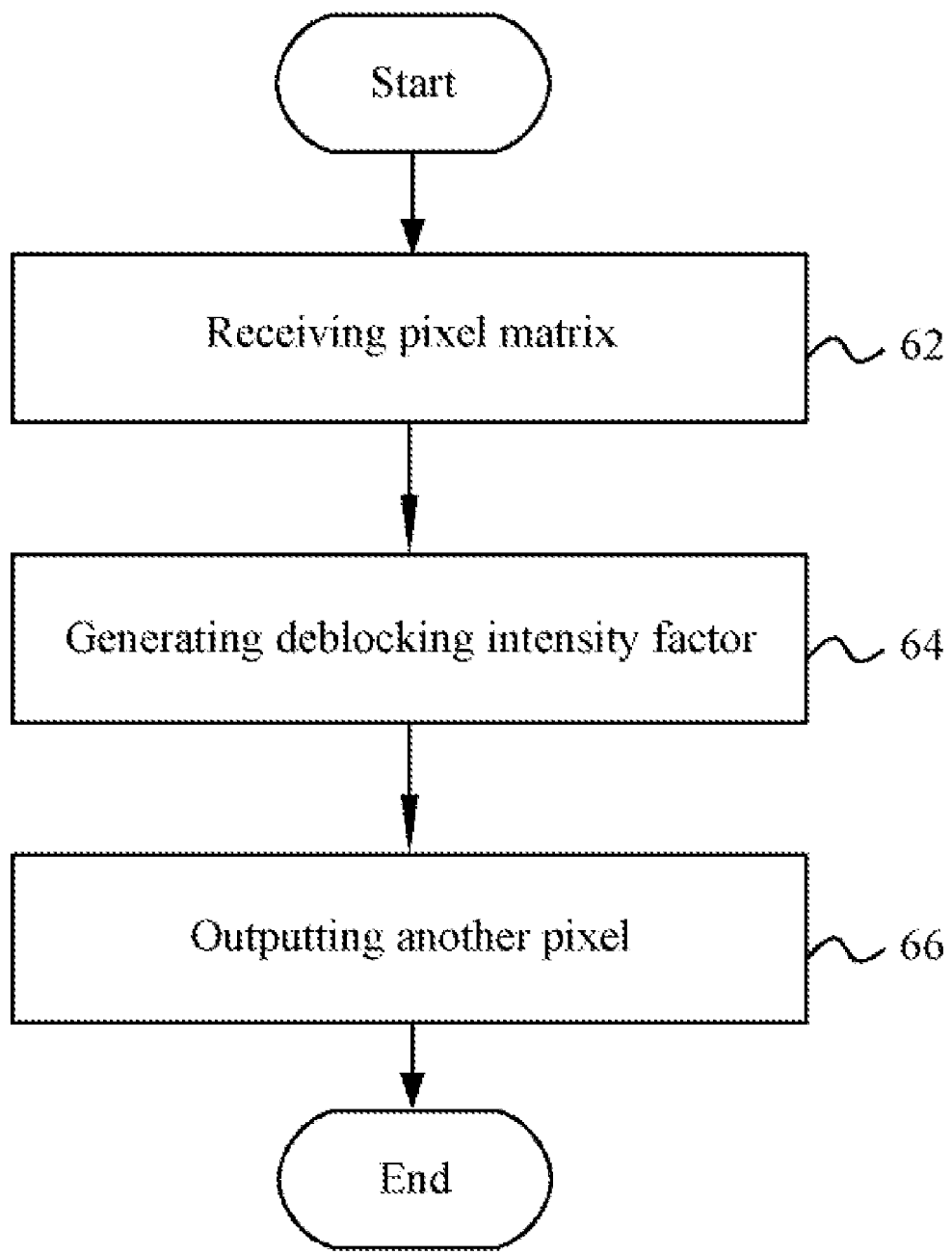
FIG. 6 is a flowchart of a deblocking method according to one embodiment of the present invention.

FIG. 6 is a flowchart of a deblocking method according to one embodiment of the present invention. First, in Step 62, the pixel matrix In is received; in Step 64, according to the pixel matrix In, the deblocking intensity factor α is dynamically generated. For example, the deblocking intensity factor α is calculated by Equation (1) according to the slope difference of the target pixel and the neighboring pixel corresponding to the target pixel, the image coarseness corresponding to the target pixel and the lookup table. In another embodiment, according to the steps in FIG. 4, the deblocking intensity factor α is adjusted to α_IIR, α_FIR, α_adjust, α_extend and α(line,x) according to the period, the coefficient sequence, the lookup table and the coefficient respectively. Finally, in Step 66, according to the deblocking intensity factor α, another pixel matrix Out is outputted.

Figure 7:
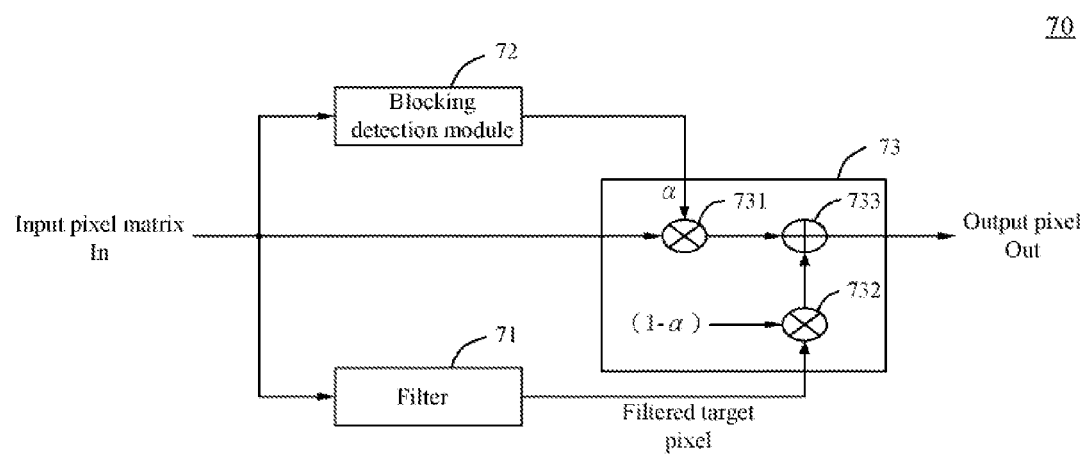
FIG. 7 is a block diagram of the deblocking apparatus according to another embodiment of the present invention.

FIG. 7 is a block diagram of the deblocking apparatus 70 according to another embodiment of the present invention. The deblocking apparatus 70 comprises a filter 71, a blocking detection module 72 and a blending unit 73. The components in the deblocking apparatus 70 are similar to those in the blocking apparatus 20 in FIG. 2. The main difference is the connections between the components. In an α-blending operation of the blending unit 73, the input video signal is multiplied with the deblocking intensity factor α generated by the blocking detection module 72, and the filtered target pixel outputted from the filter 71 is multiplied by (1−α). Therefore, by adjusting the deblocking intensity factor α, the deblocking apparatus 70 can adjust a ratio between the filtered target pixel and the input target pixel in the final output pixel to achieve the desired deblocking effect. In this embodiment, the deblocking intensity factor α becomes smaller as the blocking artifact gets more severe; that is, the output pixel has a tendency to accept the filtered target pixel but not the original input target pixel. On the contrary, the deblocking intensity factor α becomes larger as the blocking artifact gets milder; that is, the output pixel has a tendency to accept the original input target pixel but not the filtered target pixel—such description is somewhat different from the above, but the method is similar.

The deblocking apparatus according to the invention may be into a single IC chip, such as a display control chip. For example, before the deblocking apparatus, preferably the line buffer (not shown) can be connected for buffering the pixel data of a plurality of scan lines after decoding. Alternatively, the deblocking apparatus of the present invention can be incorporated into a digital video disc (DVD) player or a computer graphic card (not shown). For example, the deblocking apparatus can process a decoded MPEG pixel matrix received by an MPEG video decoder (not shown).

From the above, the present invention provides a deblocking apparatus comprising a filter for receiving a target pixel of the pixel matrix to generate a filtered target pixel; a blocking detection module for generating a deblocking intensity factor according to the pixel matrix; and a blending unit for receiving the target pixel and the filtered target pixel, and for dynamically blending the target pixel and the filtered target pixel according to the deblocking intensity factor to generate an output pixel. Preferably, the blocking detection module comprises an IIR filter for calculating an average according to a period to adjust the deblocking intensity factor, wherein the pixel matrix comes from an input video signal and the period corresponds to a compression type of the input video signal.

The present invention further provides a deblocking method comprising receiving the pixel matrix; generating a deblocking intensity factor of a target pixel corresponding to the pixel matrix according to the pixel matrix; and dynamically generating an output pixel by processing the target pixel according to the deblocking intensity factor. Preferably, the step of generating the deblocking intensity factor generating the deblocking intensity factor according to an image coarseness corresponding to the target pixel and a slope difference corresponding to a neighboring pixel of the target pixel While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A deblocking apparatus for deblocking a plurality of blocking effects on a pixel matrix defining a digital video signal, comprising: a filter, for receiving each pixel of the pixel matrix as a first target pixel of the pixel matrix to generate a first filtered pixel, wherein each pixel is associated with one of the plurality of blocking effects;

a blocking detection module, detecting the blocking effect of the first target pixel according to the first target pixel and the first filtered pixel and generating a deblocking intensity factor corresponding to the first target pixel as a function of the first target pixel, such that each pixel has its own generated de-blocking intensity factor;

and a blending unit, for receiving the first target pixel and the first filtered pixel, and for dynamically blending the first target pixel and the first filtered pixel according to the deblocking intensity factor to generate a first output pixel.

2. The deblocking apparatus according to claim 1, wherein the blocking detection module comprises an infinite impulse response (IIR) filter for calculating an average over a period to adjust the deblocking intensity factor, wherein the period is associated with the blocking effects on the pixel matrix.

3. The deblocking apparatus according to claim 1, wherein the blocking detection module comprises a finite impulse response (FIR) filter for outputting the deblocking intensity factor according to a coefficient sequence.

4. The deblocking apparatus according to claim 1, wherein the blocking detection module adjusts the deblocking intensity factor by looking up a lookup table according to a coarseness value.

5. The deblocking apparatus according to claim 4, wherein the lookup table is a one-dimensional counter table.

6. The deblocking apparatus according to claim 1, wherein the blocking detection module adjusts the deblocking intensity factor for a second target pixel wherein the first target pixel is adjacent to the second target pixel.

7. The deblocking apparatus according to claim 1, wherein the blocking detection module calculates an average according to a coefficient, and adjusts the deblocking intensity factor according to the average.

8. The deblocking apparatus according to claim 7, wherein the blocking detection module comprises an IIR filter for calculating the average.

9. A method for deblocking a plurality of blocking effects on a pixel matrix defining a digital video signal, comprising: receiving the pixel matrix, wherein each pixel associated with one of the plurality of blocking effects;

generating a deblocking intensity factor for a first target pixel of the pixel matrix as a function of the first target pixel by detecting the blocking effect of the first target pixel according to the first target pixel, such that each pixel has its own generated de-blocking intensity factor;

generating a first filter pixel for the first target pixel of the pixel matrix;

and dynamically generating a first output pixel by blending the first target pixel and the first filtered pixel according to the deblocking intensity factor.

10. The method according to claim 9, further comprising: calculating an average for adjusting the deblocking intensity factor over a period, wherein the period is associated with the blocking effects on the pixel matrix.

11. The method according to claim 9, further comprising: adjusting the deblocking intensity factor by utilizing an IIR filter.

12. The method according to claim 9, further comprising: adjusting the deblocking intensity factor according to a coefficient sequence.

13. The method according to claim 9, wherein the step of generating the deblocking intensity factor generates the deblocking intensity factor according to an image coarseness corresponding to the first target pixel and a slope difference between the first target pixel and a second target pixel, wherein the first target pixel is adjacent to the second target pixel.

14. The method according to claim 9, further comprising:
adjusting the deblocking intensity factor for a second target pixel wherein the second target pixel is adjacent to the first target pixel.

15. The method according to claim 9, wherein the step of generating the deblocking intensity factor generates the deblocking intensity factor according to a coarseness value by looking up a lookup table.

16. The method according to claim 9, wherein the lookup table is a one-dimensional counter table.

17. The method according to claim 9, further comprising:
performing infinite impulse response filtering to adjust the deblocking intensity factor.

18. The method according to claim 9, further comprising:
performing finite impulse response filtering according to a coefficient sequence to adjust the deblocking intensity factor.

* * * * *